(12) United States Patent
Medvinsky et al.

(10) Patent No.: US 8,887,310 B2
(45) Date of Patent: Nov. 11, 2014

(54) SECURE CONSUMER PROGRAMMING DEVICE

(75) Inventors: Alexander Medvinsky, San Diego, CA (US); Stuart P. Moskovics, San Diego, CA (US); Madjid F. Nakhjiri, San Diego, CA (US); Jason A. Pasion, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 786 days.

(21) Appl. No.: 12/622,016

(22) Filed: Nov. 19, 2009

(65) Prior Publication Data

US 2011/0119739 A1    May 19, 2011

(51) Int. Cl.
| | | |
|---|---|---|
| G06F 21/00 | (2013.01) | |
| H04W 12/04 | (2009.01) | |
| H04L 29/08 | (2006.01) | |
| H04L 29/06 | (2006.01) | |
| H04W 12/06 | (2009.01) | |

(52) U.S. Cl.
CPC ............. *H04L 63/108* (2013.01); *H04W 12/04* (2013.01); *H04L 63/0823* (2013.01); *H04W 12/06* (2013.01); *H04L 67/04* (2013.01)
USPC ............................................. 726/30; 726/27

(58) Field of Classification Search
CPC ....... H04W 8/18; H04W 4/12; H04W 76/025; H04W 4/00; H04W 76/02; H04W 8/22; H04W 24/00; H04L 67/28; H04L 41/5054; H04L 69/40; H04L 67/34; H04L 67/16; H04L 41/0893; H04L 41/5058; H04L 67/125; H04M 15/88
See application file for complete search history.

(56) References Cited

U.S. PATENT DOCUMENTS

| | | | |
|---|---|---|---|
| 6,725,379 | B1 | 4/2004 | Dailey |
| 6,975,204 | B1 | 12/2005 | Silver |
| 2002/0111787 | A1* | 8/2002 | Knyphausen et al. ............ 704/2 |
| 2002/0154781 | A1* | 10/2002 | Sowa et al. ................... 380/278 |
| 2005/0045717 | A1 | 3/2005 | Rager et al. |
| 2007/0099599 | A1* | 5/2007 | Smith et al. ................ 455/414.1 |
| 2008/0005577 | A1* | 1/2008 | Rager et al. ................... 713/183 |
| 2008/0225865 | A1 | 9/2008 | Herzog |
| 2009/0006852 | A1 | 1/2009 | Qiu et al. |
| 2010/0058329 | A1* | 3/2010 | Durazzo et al. ............... 717/176 |

FOREIGN PATENT DOCUMENTS

WO    WO 2008085205 A2 *    7/2008

OTHER PUBLICATIONS

"Patent Genius, Theft prevention", Patent Genius, Accessed Sep. 23, 2008 http://www.patentgenius.com/class/726/35.html.

* cited by examiner

*Primary Examiner* — Philip Chea
*Assistant Examiner* — Carlton Johnson
(74) *Attorney, Agent, or Firm* — Morris & Kamlay LLP (57) ABSTRACT

A method is provided for operating a consumer programming device that provisions consumer electronic devices. The method includes receiving over a communication link a first enable message that authorizes the consumer programming device to make available one or more resources which enable it to provide services to consumer electronic devices. Services are provided to consumer electronic devices up until all the resources have been exhausted. Additional consumer electronic devices are provided with services only if a second enable message is received over the communication link.

20 Claims, 4 Drawing Sheets

SECURE CONSUMER PROGRAMMING DEVICE

FIELD OF THE INVENTION

The present invention relates generally to the disablement of servers that are designed to perform secure transactions such as provisioning of secure or confidential information into consumer electronic devices.

BACKGROUND

During the manufacturing of relatively complex, software-driven consumer products such as communications units, mobile phones, subscriber devices, or the like, data must be loaded into the product to control operation and provide, for example, an operating software baseline and other data required for operation. For instance, some data may be common to every phone produced by a manufacturer, such as the operating software, while other data, such as configuration data for a mobile service provider network, may be specific to one or a group of phones. Mobile service providers, for example, may require phones programmed with parameters associated with the service provider's particular network and thus groups of phones associated with the mobile service provider will have many of the same programming parameters.

In many mobile phone applications, features are already present in a phone and may be controlled, e.g. enabled and/or disabled, almost exclusively through software based on the services which an individual user or subscriber has paid for. In many service environments such as Global System for Mobile communications (GSM) environments, phone subsidies may be offered to customers by service providers to reduce or eliminate the cost of hardware in exchange for service subscriptions with the service provider offering the subsidy. Data is often stored with such subsidized phones to prevent activation or operation with a non-subsidy service provider.

A configuration programming device generally maintains the configuration information with which each consumer product is to be provisioned. The configuration information includes both the consumer product-specific information and the common consumer product information. The configuration programming device may be located in the factory that manufactures the consumer product or in a service center maintained by service provider. In this way the consumer products may be provisioned with the information by establishing a connection between each consumer product and the configuration programming device.

The configuration programming device thus contains a significant amount of information that needs to be maintained in a secure manner. If the configuration programming device were to be stolen or tampered with, it could be used to provide unauthorized users with access to secure configuration information that could allow them to configure and operate a relatively large number of illegal or otherwise unauthorized consumer products.

Many other scenarios exist when a server performing secure transactions needs to be protected and disabled after it has been stolen. For example, in a factory environment there is often a secure server that loads secret cryptographic information into each manufactured chip, component or a consumer electronics device. If such a server were stolen, it could enable the perpetrator to manufacture illegal devices with stolen device identities.

SUMMARY

In accordance with one aspect of the invention, a method is provided for operating a consumer programming device that provisions consumer electronic devices. The method includes receiving over a communication link a first enable message that authorizes the consumer programming device to make available one or more resources which enable it to provide services to consumer electronic devices. Services are provided to consumer electronic devices up until all the resources have been exhausted. Additional consumer electronic devices are provided with services only if a second enable message is received over the communication link.

In accordance with another aspect of the invention, a consumer programming device is provided which includes a controller configured to generate data for provisioning a plurality of consumer electronic devices into an active state. The consumer programming device also includes at least one memory unit configured to store the data for providing services to consumer electronic devices. The controller is further configured to receive resource authorization from an external source that allows the data to be transferred from the memory unit to the consumer electronic devices when each of the consumer electronic devices in turn communicates with the consumer programming device.

DETAILED DESCRIPTION

The principles and concepts discussed and described herein may be particularly applicable to secure servers involved in various secure transactions and the like. For example, secure servers may be involved in the manufacturing, configuration, customization of units, devices, and systems providing or facilitating voice communications services or data or messaging services over wide area networks (WANs), such as conventional two way systems and devices, various cellular phone systems including analog and digital cellular, CDMA (code division multiple access) and variants thereof, GSM (Global System for Mobile communications), GPRS (General Packet Radio System), 2.5 G and 3G systems such as UMTS (Universal Mobile Telecommunication Service) systems, integrated digital enhanced networks and variants or evolutions thereof. Principles and concepts described herein may further be applied in manufacturing, configuration, customization or otherwise securely transacting with devices or systems with short range communications capability normally referred to as W-LAN capabilities, such as IEEE 802.11, Bluetooth, or Hiper-LAN and the like that may utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures. Of course, the principles and concepts discussed and described herein may be applicable to other types of secure servers that perform secure electronic transactions with client systems.

Figure 1:
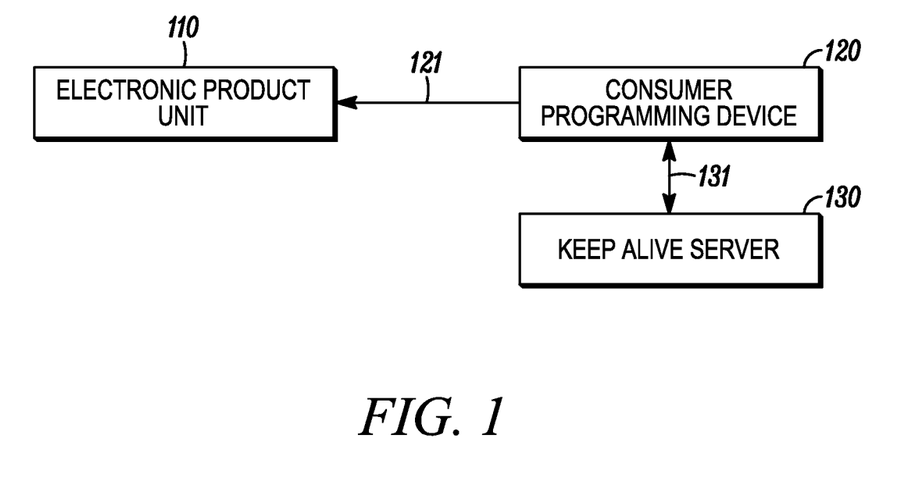
FIG. 1 shows a simplified diagram of an electronic product unit 110, a consumer programming device and a keep-alive server.

FIG. 1 shows a simplified diagram of an electronic product unit 110 and a consumer programming device 120. In this example the illustrative product unit 110 is representative of a host of consumer products or electronic devices, such as communication units (e.g, mobile phones), cable modems, set-top boxes and the like. Moreover, the electronic product unit 110 need not be a complete device. For instance, it may be a chip or other component or sub-assembly of a larger device that is being manufactured.

The consumer programming device 120, which may be a dedicated production or service device, may have, for example, a communication link to the product unit 110 as well as a processor and loading software having access to resources of the product unit 110, e.g. through access to address space within the product unit 110 for data reading and writing and configuration as would be appreciated by those of ordinary skill in the art. The consumer programming device 120 also stores the configuration information with which a series of such product units 110 are to be provisioned. Of course, other types of secure transactions between the consumer programming device 120 and the electronic product unit 110 are also possible and thus the present example is presented by way of illustration only.

FIG. 1 also shows a keep-alive server 130 that sends keep-alive or enable packets or messages to the consumer programming device 120. The messages authorize the consumer programming device 120 to make available the resources that are necessary to provide services to one or more electronic product units with configuration information. Keep-alive server 130 communicates with the consumer programming device 120 over a link 131. If the link 131 is broken so that enable messages can no longer reach the consumer programming device 120, the consumer programming device 120 will no longer be able to obtain new resources beyond those that were authorized by the last-received keep-alive message. In order to continue providing services to the electronic product unit 110 over link 121, the consumer programming device 120 may be required to provide a prompt response to each enable message.

Illustrative resources that may be made available by the consumer programming device 120 may include the number of signed messages that can be sent, the number of minutes or hours of service remaining, the number of keys and/or digital certificates that can be loaded, the number of devices that can initialized (which may not be the same as the number of keys that can be loaded if a message contains multiple keys for one product unit). Illustrative services that may be provided to the electronic product unit 110 may include programming of the International Mobile Equipment Identity (IMEI) in the case of mobile devices, programming of a bootloader, programming of cryptographic keys and digital certificates into the electronic product unit 110, and the like.

In some implementations the keep-alive server 130 may also send an additional message to an operator specifying that the connection between the consumer programming device 120 and the keep-alive server 130 has been lost, thereby possibly indicating that the consumer programming device 120 may have been tampered with, stolen or otherwise removed from the factory or other location without authorization.

Communication between the keep-alive server 130 and the consumer programming device 120 may be established over link 131 using a secure connection. For instance, the transport layer security (TLS) protocol may be employed to provide end to end encryption at the transport layer so that authentication and communications confidentiality can be achieved between the two devices. Accordingly, if the TLS protocol is employed the consumer programming device 120 may serve as a TLS server and the keep-alive server 130 may serve as a TLS client. In this way the keep-alive server 130 can authenticate the consumer programming device 120. The TLS session may begin when the keep-alive server 130 uses a server TLS certificate to validate the certificate's digital signature of the consumer programming device 120.

In one particular implementation the consumer programming device 120 may be used to provision a wireless communication device that employs a subscriber identity module, or SIM, card. SIM cards hold configuration parameters, such as home public land mobile network (HPLMN) information, an international mobile subscriber identifier (IMSI), and group identifiers (GID1/GID2), that are coded with values that bind the communication device to the issuing service provider and the customer. The group identifiers GID1 and GID2, together with the IMSI, may uniquely identify a SIM card that belongs to a set of SIM cards that are allowed to be used on the wireless communication device 120 in accordance with a particular SIM policy. When a service provider sells a service agreement, the purchasing customer is typically provided a communication device with a pre-installed, personalized SIM card.

Wireless communication network service providers frequently provide these communication devices, such as cellular telephones, to new customers at deep discounts as an enticement to sign long term service agreements. In this case, the service provider essentially sells the wireless communication device to the new customer at a loss, called a subsidy. This subsidy represents a substantial investment that the service provider hopes to recover from the customer in the form of user fees to be collected over the life of the service agreement.

The subsidy is a marketing investment that the service provider seeks to protect via a subsidy lock mechanism in the wireless communication device. A subsidy lock is used to insure that a subsidized wireless communication device can only be used with SIM cards issued by the subsidizing operator such that this wireless communication device will generate billable airtime for that operator. Various hardware or software techniques are used to insure that the wireless communication device can only accept SIM cards issued by the subsidizing operator. The subsidy locking mechanisms must be very robust to prevent sophisticated hackers from circumventing the subsidy lock, replacing the SIM card, and then reselling a subsidized wireless communication device to a user of another network. At the same time, the subsidy locking mechanisms must be configured to easily allow a customer to unlock the phone via a password at the end of the service agreement should the customer choose to switch to a different service provider.

One example of a consumer programming device 120 that can be used to provision wireless communication devices in a secure manner so that they can only accept SIM cards issued by the subsidizing operator is referred to as a digital signing server. While digital signing servers may be used to provision a variety of consumer electronic devices other than wireless communication devices, various features and advantages that arise from the use of a keep-alive server to secure a consumer programming device will now be illustrated in connection with a digital signing server that provisions a subsidized wireless communication device equipped with a SIM card.

In the following example a subsidy-locked wireless communication device includes a memory that stores an asymmetrically digitally signed active data block and unlock data block. It should be noted that signed active data blocks and unlock datablocks are two examples of a device provisioning data blocks. Accordingly, the methods, techniques and systems described herein are applicable to any type of device provisioning block. The signed active data block represents the current operational lock state of the wireless communication device. Prior to storage in the wireless communication device memory, the unlock data block is first generated with a locking state parameter set to the unlocked state and with binding parameters associated with a circuit in the wireless communication device. The unlock data block is then asymmetrically digitally signed. After signing, the unlock data block is modified based on a password and is then stored in the wireless communication device memory. In one example the modifying of the unlock data block may include replacing or altering of a password portion of the signed unlock data block. In another example the modifying of the unlock data block may include encryption of the signed unlock data block based on a password. A wireless communication device provisioned with such an unlock data block and with an active data block indicating a locked state remains in the locked state until the asymmetric digital signature of the unlock data block can be verified via a public key. The wireless communication device can modify the stored, unlock data block using a password received from a user. In this way SIM-locking security is enhanced by insuring that the wireless communication device does not contain all of the critical information necessary for generating the unlock state. In other words, since the unlock password necessary to make the unlock data block validate is not contained in the wireless communication device, even if a hacker manages to get unauthorized software code to execute on the wireless communication device, critical information needed to unlock the phone is simply not available in any form on the wireless communication device.

Figure 2:
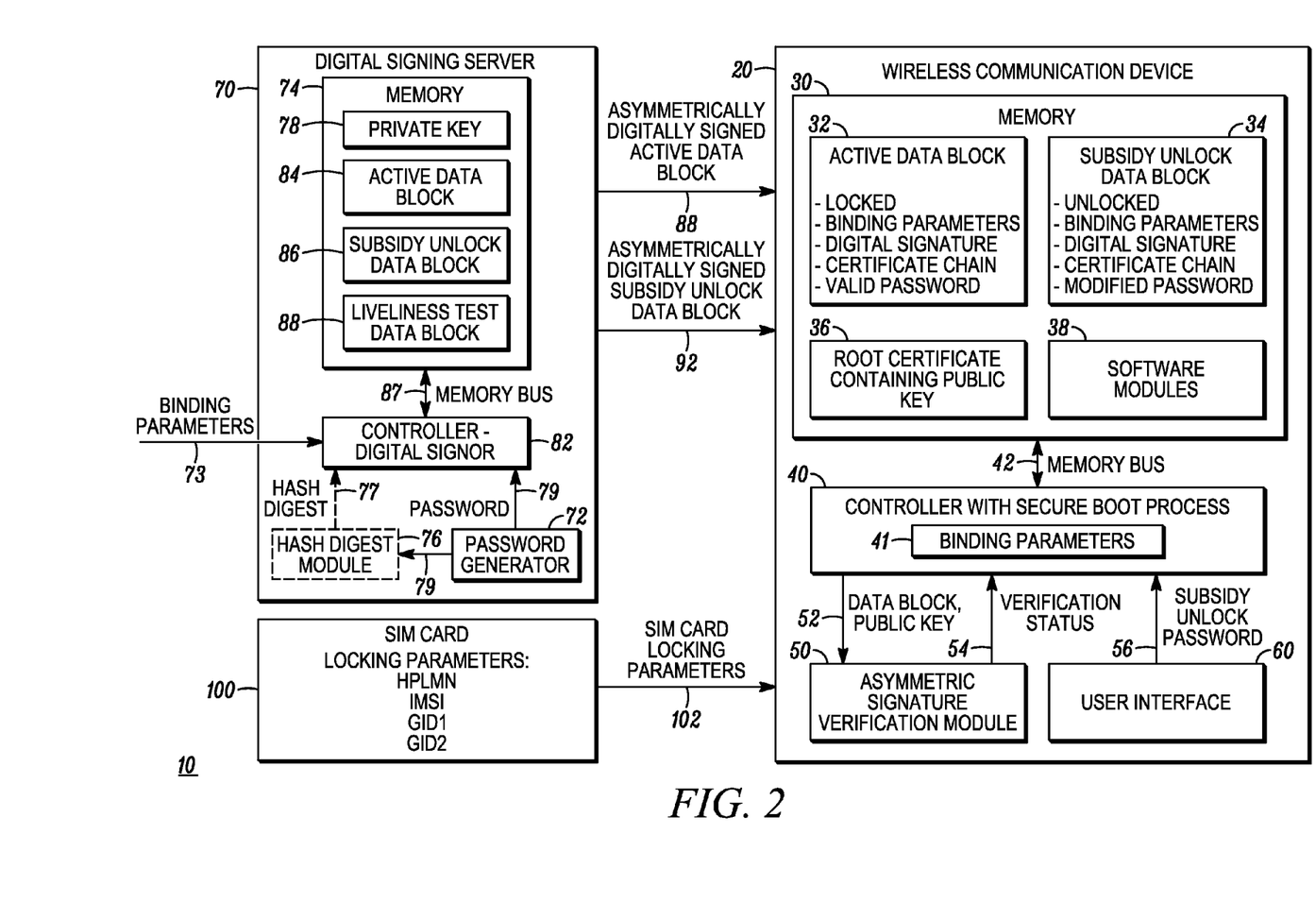
FIG. 2 shows a simplified diagram similar to FIG. 1 in which the electronic product unit is a mobile communication device equipped with a SIM card and the consumer programming device is a digital signing server.

FIG. 2 shows a simplified diagram similar to FIG. 1 in which the electronic product unit 110 is a wireless communication device 20 equipped with a SIM card 100 and the consumer programming device 120 is a digital signing server 70. The SIM card 100, when coupled to the wireless communication device 20, provides SIM card locking parameters 102 to the wireless communication device 20. The wireless communication device 20 illustratively includes: a controller 40 with a secure boot process; memory 30 including an active data block 32, a subsidy unlock data block 34, a root certificate containing a public key 36, software modules 38; an asymmetric signature verification module 50; and a user interface 60. In this example, the controller 40 executes software instructions obtained from the memory 30 via a memory bus 42 to control the operation of the wireless communication device 20.

When the wireless communication device 20 begins operation, the data block information and public key 52 may be passed to the asymmetric signature verification module 50 for verification. The verification status 54 may be passed back to the controller 40. A subsidy unlock password 56 for use in the SIM or subsidy unlocking of the wireless communication device 20 is received through the user interface 60. Binding parameters 41 associated with the circuits in the wireless communication device 20 may be securely stored in the wireless communication device 20. For example, processor and flash IC unique identifier (UID) values may be stored in a circuit such as the controller 40, or may they be stored in the memory 30.

The digital signing server 70 generates the asymmetrically digitally signed active data block 32 and the asymmetrically digitally signed subsidy unlock data block 34. In the example shown in FIG. 2 the signing server 70 is operatively coupled to the wireless communication device 20. Alternatively, in some cases the wireless communication device 20 may be coupled to a programming station, such as a PC, that is further coupled to the signing server 70. The programming station may generate the data for the active data block 84 and the subsidy unlock data block 86. The signing server 70 may compute the asymmetric digital signatures for the active data block 84 and the subsidy unlock data block 86 and may generate the password 79 and modify the subsidy unlock data block 86 after signing.

In the example shown in FIG. 2 the digital signing server 70 includes a memory 74 holding a private key 78, an active data block 84, and a subsidy unlock block 86. Alternatively, the private key may be held in a hardware security module (HSM), not shown, that is coupled to the signing server controller 82. The controller 82 is operatively coupled to the memory 74. The controller 82 is operative to generate and store in memory 74 a subsidy unlock data block 86, to asymmetrically digitally sign the subsidy unlock data block 86, to modify the asymmetrically digitally signed subsidy unlock data block 86 based on the password, and to send a modified asymmetrically digitally signed subsidy unlock data block 92 to the wireless communication device 20. The controller 82 is further operative to generate and store in memory 74 an active data block 84, asymmetrically digitally sign the active data block 84, and send an asymmetrically digitally signed subsidy active data block 88 to the wireless communication device 20.

The digital signing server 70 may also include a password generator 72, such as a random password generator. The password 79 may be used directly by the controller 82 in the generation of the unlock data block 86. Alternatively, a hash digest module 76 may be included to generate a hash digest 77 of a random password 78. For example, a SHA-1 digest may be generated on the random password 78 to generate a password hash digest 77 having a fixed length. The subsidy unlock data block 86 may include the random or unique password 79 or password hash digest 77 for a password portion to protect the subsidy lock state from unauthorized disabling. It is understood that the password may be the literal password or may be any data representing or derived from the password such as a hash digest of the password.

Once the active data block 84 and subsidy unlock data block 86 are generated by the digital signor from binding parameters 73 and passwords 77 or 79, the controller 82 asymmetrically digitally signs the blocks using the private signing key 78. The digital signing method may be any algorithm that signs a data block such as, but not limited to, RSA, DSA and ECDSA algorithms as are known in the art. The signing may be performed by a hardware security module (HSM) which contains the private signing key. In the case of the active data block, the asymmetric digital signed active data block 88 is sent to the wireless communication device 20 where the wireless communication device 20 installs this block into memory 30 as the active data block 32. In the case of the unlock data block, the signed unlock data block is modified by the controller 82 to invalidate the signature that was computed and is then sent to the wireless communication device 20 where the wireless communication device 20 installs this block as the subsidy unlock data block 34.

The signed unlock data block may be modified by altering the password field of the unlock data block after signing. For example, the password field may be cleared to all zeros or set to all ones. The resulting modified asymmetrically digitally signed unlock data block 92 will not pass an asymmetric digital signature verification without first "un-modifying" the contents of the password field to put back the correct subsidy unlock password that was present during the signing. Alternatively, the signed unlock data block may be modified by encrypting the signed unlock data block, or a portion thereof, such as the signature field portion, based upon the password. The password may be used to derive an encryption key used in the encryption, or secret key hardware encryption may be used in a block cipher mode such as a counter mode or output feedback mode with an initialization vector derived from the password. The resulting modified asymmetrically digitally signed unlock data block 92 will not pass an asymmetric digital signature verification without first decrypting the modified asymmetrically digitally signed unlock data block 92, or portion thereof, based on the correct subsidy unlock password to thereby recreate the signed unlock data block.

The asymmetric digital signature verification of the unlock data block 34 in the wireless communication device 20 uses a public key 36 stored in the wireless communication device 20. The root certificate may contain a public key 36 corresponding to the private signing key 78. Alternatively, the root certificate may contain a public key 36 used to verify a certificate chain that contains the public key corresponding to the private signing key 78, which is sent to the wireless communication device 20 by the digital signing server 70 for storage in memory 30.

When the wireless communication device 20 powers on, or when a new SIM card 100 is inserted, the asymmetric digital signature of the active data block 32 stored in the wireless communication device memory 30 is verified. If the signature verifies, then the binding parameters in active data block 32 are compared against parameters stored in a circuit in the wireless communication device 20 to insure that this active data block 32 is installed on the intended device. If this binding check passes, then the locking state parameter in the active data block 32 is checked. If locked, then the other locking parameters of the active data block are compared against information read from the inserted SIM card, such as the HPLMN, GID1, and GID2, to decide if the SIM card 100 is accepted. If the subsidy locking state is unlocked, then all SIM cards are accepted. However, if the active data block 32 does not verify, then the wireless communication device will only be allowed to operate using a test SIM or for emergency (911) calls. When the SIM card 100 is not accepted, then a subsidy unlock event is triggered and the user is prompted for a subsidy unlock password 56.

Figure 3:
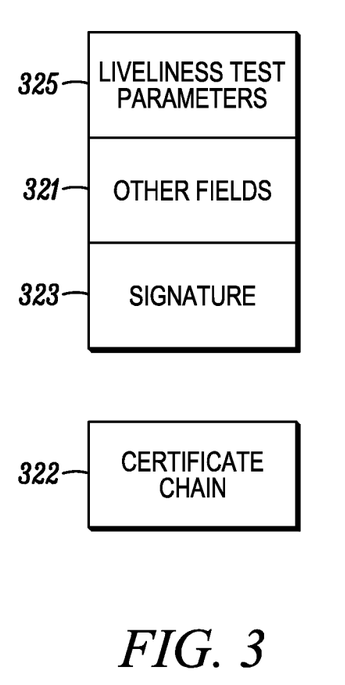
FIG. 3 is a schematic block diagram of one example of the liveliness test data structure generated by the digital signing server.

If an attempt to unlock occurs, then a password is supplied by the user and is substituted into the password field 234 of the subsidy unlock data block 230. The digital signature of the subsidy unlock data block is then verified using the public key. If the subsidy unlock data block verifies, then the subsidy locking state is checked to see if it is set for locked or unlocked. In addition, the binding parameters, such as the processor UID 238 and the Flash UID 240, of the subsidy unlock data block may be matched against the wireless communication device hardware so that the subsidy unlock data block can only be used in a single wireless communication device. If the subsidy lock state parameter is set to unlock, then the subsidy unlock data block is written over the active data block and effectively becomes the new active data block.

As previously mentioned, the keep-alive server 130 shown in FIG. 1 sends keep-alive or enable packets or messages to the digital signing server 70 shown in FIG. 2. Each enable message authorizes the digital signing server 70 to provision a predetermined number (e.g., 500-1000) of wireless communication devices 20 with configuration information such as the aforementioned signed active data block and the signed subsidy data block. In order to continue receiving enable messages so that additional wireless communication devices 20 can be provisioned, the digital signing server 70 may be required to provide a prompt response to each enable message. In some cases the response may take the form of an additional data block that is generated by the digital signing server 70, which may advantageously reduce the complexity of implementation. This data block is depicted in FIG. 2 as liveliness test data block 88.

FIG. 3 is a schematic block diagram of one example of the liveliness test data structure 88. The liveliness test data structure 88 includes, among other fields 321 that optionally may be included, a liveliness test parameter field 325. The liveliness test data structure 88 may also include an optional signature field 323 and an optional certificate chain 322 that may be used for validation of the liveliness test data block signature by the keep-alive server. Illustrative items that may be included among the liveliness test parameters may include, for example, the maximum allowable amount of time between two enable messages received by the digital signing server 70 and the number of data blocks that the digital signing server is authorized to sign until the next enable message is received. The values for these and other parameters may be selected so that there is an appropriate balance between the detection of failures and the availability and robustness of the provisioning operation by the digital signing server. That is, there is a tradeoff between the timely detection of failures or security breaches by the digital signing server or its connection to the keep-alive server and unnecessary suspensions of operations.

In some cases if the keep-alive server 130 does not receive a response to an enable message, a second enable message may be sent after the specified amount of time has elapsed. If a response is not received to the second enable message, subsequent enable messages may be sent up to some specified maximum number. After the maximum number of enable messages has been generated without receipt of an appropriate response, the keep-alive server may send an alert to a system operator. In other words, the keep-alive server may only tolerate a specified number of missed responses to its enable messages. In addition, each enable message may expire after a predetermined amount of time so that it can no longer be used to authorize additional digital signatures.

To further reduce the likelihood that configuration information may be stolen or otherwise misappropriated, the digital signing server 70 may erase or otherwise delete or remove the cryptographic keys and/or the digital certificates used to sign the data blocks if the digital signing server 70 determines that it has become disconnected from the keep-alive server 130. For example, the keys and certificates may be erased if an internal timer indicates that the digital signing server 70 has not received an enable message after a predetermined amount of time has elapsed.

Figure 4:
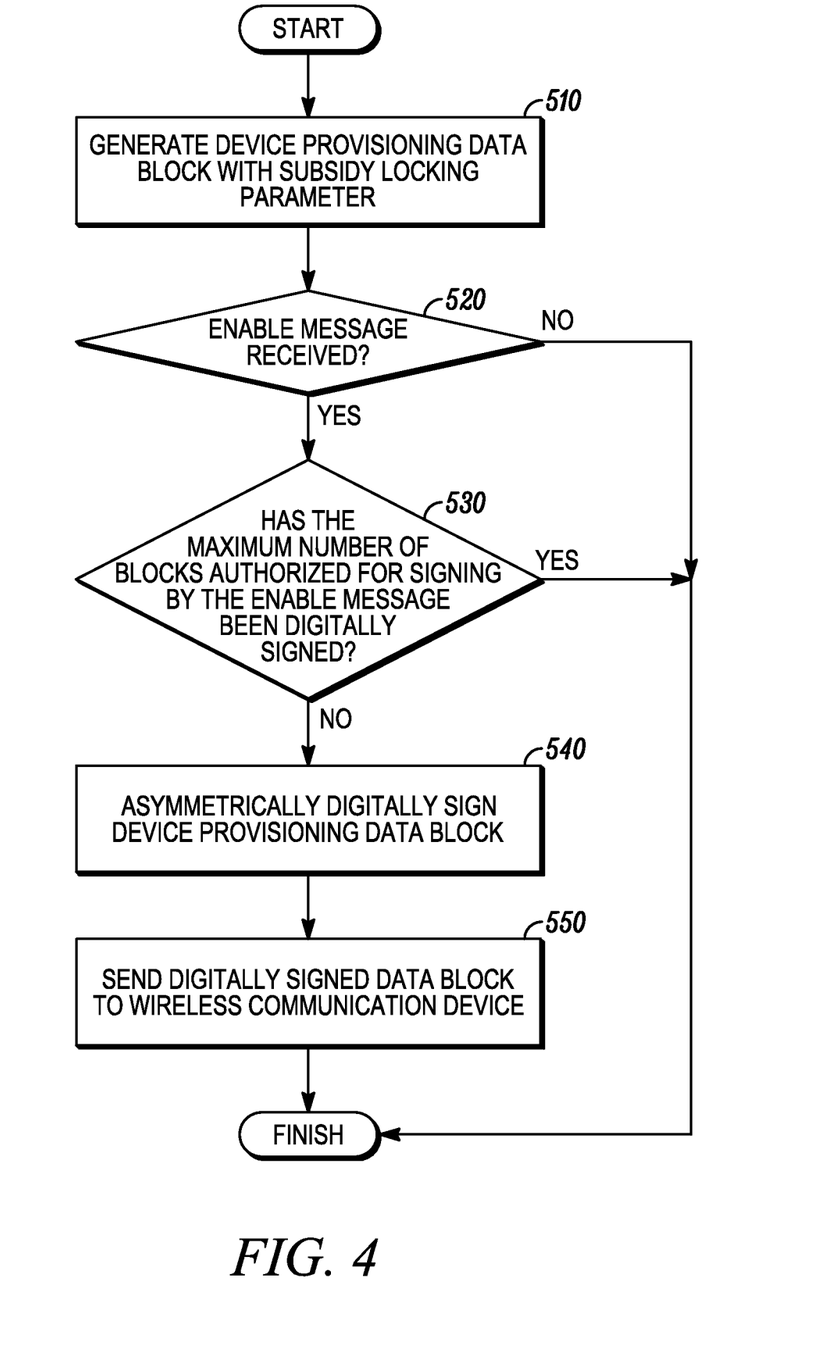
FIG. 4 is a flowchart illustrating one example of a method for provisioning a wireless communication device with an device provisioning data block so that the wireless communication device is placed in an active state.

FIG. 4 is a flowchart illustrating one example of a method for provisioning a wireless communication device with an active data block so that the wireless communication device is placed in an active state. The process begins in step 510 where the device provisioning data block 84 is generated by the digital signing server 70. The device provisioning data block includes the binding parameters 73. In decision step 520 the digital signing server 70 determines if an enable message has been received from the keep-alive server. The enable message may have a time-to-live (TTL), after which it expires so that it can no longer authorize the digital signing server to digitally sign device provisioning data blocks. Assuming the TTL of the enable message has not expired, the method proceeds to step 530. On the other hand, if an enable message has not been received, or if it has expired, the method terminates by inactivating the digital signing server 70 so that it can no longer digitally sign device provisioning data blocks. Next, if the method proceeds to decision step 530, the digital signing server 70 determines if the maximum number of blocks authorized for signing by the previously received enable message has been digitally signed and sent. If the maximum number has been reached, the method once again terminates. If the maximum number has not been reached the method proceeds to step 540, where the digital signing server 70 digitally signs the device provisioning data block 84 using the private key 78. The digital signing method may be any algorithm that signs a data block such as, but not limited to, RSA, DSA and ECDSA algorithms as are known in the art. In step 550, the digital signing server 70 sends the digitally signed, device provisioning data block 88 to the wireless communication device 20.

The processes described above, including but not limited to those shown in FIG. 4, may be implemented in a general, multi-purpose or single purpose processor. Such a processor will execute instructions, either at the assembly, compiled or machine-level, to perform that process. Those instructions can be written by one of ordinary skill in the art following the description herein and stored or transmitted on a computer readable storage medium. The instructions may also be created using source code or any other known computer-aided design tool. A computer readable storage medium may be any physical medium capable of carrying those instructions and include a CD-ROM, DVD, magnetic or other optical disc, tape, and silicon memory (e.g., removable, non-removable, volatile or non-volatile).

Although various embodiments are specifically illustrated and described herein, it will be appreciated that modifications and variations of the present invention are covered by the above teachings and are within the purview of the appended claims without departing from the spirit and intended scope of the invention.

The invention claimed is:

1. A method of operating a consumer programming device that provisions consumer electronic devices, comprising:
   receiving, by the consumer programming device, over a communication link a first enable message that authorizes the consumer programming device to make a number of resources available, wherein the resources enable the consumer programming device to provide services to a predetermined number of consumer electronic devices;
   providing, by the consumer programming device, services to consumer electronic devices up until all the resources in the number of resources have been exhausted;
   determining, by the consumer programming device, if a second enable message is received over the communication link;
   if the second enable message has not been received, inactivating, by the consumer programming device, the consumer programming device such that the consumer programming device cannot provide services to consumer electronic devices; and
   responding to receipt of the first enable message to permit receipt of the second enable message.

2. The method of claim 1 wherein the consumer programming device is a digital signing server that performs the receiving and digital signing of device configuration parameters.

3. The method of claim 2 wherein provisioning each of the consumer electronic devices comprises:
   generating a digitally signed device provisioning data block; and
   sending the digitally signed device provisioning data block to the consumer electronic device.

4. The method of claim 3 wherein each of the consumer electronic devices includes a subscriber identity module (SIM) and wherein provisioning each of the consumer electronic devices further comprises:
   generating an unlock data block for unlocking the consumer electronic device so that other SIMs may be used therewith, said unlock data block including a password portion, a locking state parameter, and a binding parameter associated with a circuit in the consumer electronic device;
   digitally signing the unlock data block;
   modifying the password portion of the digitally signed unlock data block; and
   sending the modified digitally signed unlock data block to the consumer electronic device.

5. The method of claim 3 wherein the digitally signed device provisioning data block includes binding parameters that bind each of the consumer electronic devices to a particular user and a particular service provider.

6. The method of claim 5 wherein the consumer electronic devices are wireless communication devices and the binding parameters include home public land mobile network (HPLMN) information, an international mobile subscriber identifier (IMSI), and group identifiers.

7. The method of claim 2 further comprising removing one or more cryptographic keys and/or certificates used to digitally sign the device configuration parameters if an enable message is not received after expiration of a predetermined amount of time.

8. The method of claim 3 further comprising:
   generating a liveliness test data block in response to receipt of the first enable message; and
   sending the liveliness test data block to a server that generates the first enable message in order to receive the second enable message.

9. The method of claim 1 wherein the one or more resources includes a cryptographic key and a digital certificate.

10. A consumer programming device, comprising:
    a controller configured to generate data for provisioning a plurality of consumer electronic devices into an active state; and
    at least one memory unit configured to store the data for providing services to consumer electronic devices,
    wherein the controller is further configured to
       receive a first resource authorization from an external source that allows the data to be transferred from the memory unit to a predetermined number of the consumer electronic devices when each of the consumer electronic devices in turn communicates with the consumer programming device
       determine if the consumer programming device has been disconnected from the external source due to not receiving a second resource authorization, and
       if the consumer programming device has been disconnected, inactivating the consumer programming device such that the controller cannot transfer the data for providing services to the consumer electronic devices.

11. The consumer programming device of claim 10 wherein the first resource authorization received from an external source is an enable message indicating that a server is in communication with the consumer programming device over a communication link.

12. The consumer programming device of claim 11 wherein the controller is further configured to respond to receipt of the enable message with a reply message that is necessary in order to receive subsequent enable messages.

13. The consumer programming device of claim 10 wherein the controller generates the data in a format that includes a digitally signed device provisioning data block.

14. The consumer programming device of claim 12 wherein the controller generates the data in a format that includes a digitally signed device provisioning data block and the controller generates the reply message in a data block format.

15. The consumer programming device of claim 13 wherein the at least one memory unit is further configured to store cryptographic keys for digitally signing the digitally signed device provisioning data blocks and the controller is further configured to remove the cryptographic keys if the second resource authorization in an enable message is not received after expiration of a predetermined amount of time.

16. The consumer programming device of claim 10 wherein the data includes a cryptographic key and a digital certificate.

17. At least one non-transitory computer-readable medium encoded with instructions which, when executed by a processor, performs a method including:
generating, by a consumer programming device, a plurality of device provisioning data blocks for respectively provisioning a plurality of consumer electronic devices with device configuration data;
digitally signing, by the consumer programming device, at least a subset of the plurality of device provisioning data blocks if authorized by one or more messages received over a communication link from a keep-alive server, each message authorizing a prescribed number of device provisioning data blocks to be signed;
determining if the consumer programming device should be inactivated based on not receiving a second authorization message over the communication link from the keep-alive server; and
if the consumer programming device should be inactivated, terminating the signing so that remaining ones of the plurality of devices provisioning data blocks are unsigned.

18. The non-transitory computer-readable medium of claim 17 further comprising sending a liveliness test data block to the keep-alive server in response to receipt of each of the messages.

19. The non-transitory computer-readable medium of claim 17 further comprising removing one or more cryptographic keys and/or certificates used to digitally sign the device provisioning data blocks if a message is not received from the keep-alive server after expiration of a predetermined amount of time.

20. The non-transitory computer-readable medium of claim 17 wherein each of the consumer electronic devices includes a subscriber identity module (SIM) and further comprising:
generating a plurality of unlock data block for respectively unlocking the plurality of consumer electronic devices so that other SIMs may be used therewith, each of said unlock data blocks including a password portion, a locking state parameter, and a binding parameter associated with a circuit in the consumer electronic device;
digitally signing at least a subset of the plurality of unlock data blocks if authorized by one or more messages received over a communication link from a keep-alive server;
modifying the password portion of each of the digitally signed unlock data blocks; and
terminating the signing so that remaining ones of the plurality of unlock data blocks are unsigned if not authorized to do so by the one or more of the messages received over the communication link from the keep-alive server.

* * * * *